(12) United States Patent
Albagli

(10) Patent No.: US 6,393,098 B1
(45) Date of Patent: May 21, 2002

(54) AMPLIFIER OFFSET AND GAIN CORRECTION SYSTEM FOR X-RAY IMAGING PANEL

(75) Inventor: Douglas Albagli, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/386,723

(22) Filed: Aug. 31, 1999

(51) Int. Cl.$^7$ .................................................. H05G 1/64
(52) U.S. Cl. ...................................... 378/98.2; 378/98.8
(58) Field of Search ................................. 378/98.8, 207, 378/98.2, 98.7; 250/370.09, 370.11; 348/241, 243, 294, 297, 300, 301, 302, 308

(56) References Cited

U.S. PATENT DOCUMENTS

| | | | |
|---|---|---|---|
| 4,075,484 A | * 2/1978 | Meyer-Ebrecht et al. | ... 378/207 |
| 5,268,764 A | * 12/1993 | Kihara et al. | |
| 5,340,988 A | 8/1994 | Kingsley et al. | |
| 5,430,298 A | 7/1995 | Possin et al. | |
| 5,430,785 A | * 7/1995 | Pfoh et al. | ..................... 378/19 |
| 5,579,358 A | 11/1996 | Lin | |
| 5,610,404 A | 3/1997 | Possin | |
| 5,736,732 A | 4/1998 | Possin et al. | |
| 5,774,181 A | 6/1998 | Shyu et al. | ................... 348/300 |
| 6,002,277 A | * 12/1999 | Vulih et al. | ..................... 327/94 |
| 6,194,696 B1 | * 2/2001 | Fossum et al. | .......... 250/208.1 |

FOREIGN PATENT DOCUMENTS

| | | |
|---|---|---|
| EP | 488674 A2 | 6/1992 |
| EP | 773669 A2 | 5/1997 |
| JP | 04113766 | 4/1992 |

* cited by examiner

*Primary Examiner*—David P. Porta
(74) *Attorney, Agent, or Firm*—George C. Goodman; Donald S. Ingraham

(57) ABSTRACT

A system for correcting exposure signals generated by a matrix-addressed x-ray imaging panel by compensating for amplifier offset and gain artifacts in integrating read-out amplifiers connected to a matrix-addressed array of photo-sensors in an imaging panel. An average amplifier offset is calculated in a sequence of operations tinder control of a scan line controller and is applied to the exposure signals during normal operation of the imaging panel. A base gain calibration image is obtained periodically and is updated on a real-time basis by a real-time gain determined optionally whenever exposure signals are generated during normal operation of the imaging panel. The resulting real-time adjusted gain calibration image is divided into the amplifier offset adjusted exposure signals on a pixel-by-pixel basis to yield an exposure signal compensated for offset and gain on a real-time basis.

14 Claims, 8 Drawing Sheets

AMPLIFIER OFFSET AND GAIN CORRECTION SYSTEM FOR X-RAY IMAGING PANEL

BACKGROUND OF THE INVENTION

The invention relates generally to matrix-addressed x-ray imaging panels, and more particularly, to a system for compensating for amplifier offset and gain artifacts and correcting an image signal generated by a matrix-addressed x-ray imaging panel.

Matrix-addressed x-ray imaging panels composed of amorphous silicon TFT and photodiode arrays have many useful applications in the fields of medicine and industrial inspection. Typically, solid state imaging systems use a two dimensional matrix, or photodiode array, to convert radiation into an image having an intensity proportional to incident radiant energy. In radiation imaging systems used in medical applications, radiation energy passing through, or emanating from, a patient's body is used for non-invasive in vivo visualization. An example of a high resolution solid state radiation imaging systems for such applications is exemplified by U.S. Pat. No. 5,340,988 assigned to the General Electric Company, the assignee of the instant application. An example of flat panel radiation devices that reduce phantom noise and image artifacts for improving resolution in such imaging systems are described in U.S. Pat. No. 5,610,404, also assigned to the General Electric Company.

In order to obtain a high quality image, corrections must be made to the raw data obtained from the photosensor arrays, including offset and gain corrections related to both the imaging panel and read-out amplifiers connected to the photosensor arrays, to compensate for these effects. In some cases, the gain and offset of different amplifiers may drift with respect to one another due to temperature, electronic pick-up, drifts in regulated voltages and grounds which the amplifiers depend on, etc., resulting in imperfect corrections and line correlated artifacts. Of these contributing factors, temperature is of primary concern. Temperature regulation is generally difficult because of the significant dissipation of heat generated by electronic components. In addition, elevated temperature causes the electrical characteristics of some electronic components to drift. These effects are exacerbated if the imager has an inter-digitated design in which every other line is connected to an amplifier on opposite sides of the imager, which is a common design approach for small pitch detectors found in some mammography panels. In small pitch detectors, line offset artifacts as small as 0.2 counts are clearly seen due to the highly correlated nature of this effect.

During the readout of a given pixel, the gain and offset of the associated readout amplifier may drift with respect to all other amplifiers as a result of temperature effects and a type of electronic pick-up occurring between adjacent data lines within the imaging panel. Such undesirable signals are read out by the amplifier and presented as part of the signal from the addressed pixel.

It is therefore seen to be advantageous that corrections be made to an image signal produced by a matrix-addressed imaging panel exhibiting offset and gain artifacts.

SUMMARY OF THE INVENTION

In an exemplary embodiment of the invention, a system for compensating for amplifier offset and gain artifacts and for correcting exposure of image signals generated by a matrix-addressed x-ray imaging panel provides real-time compensation of amplifier offset and gain in integrating read-out amplifiers connected to a matrix-addressed array of photosensors in an imaging panel. The system comprises: an amplifier signal processor coupled to respective readout amplifiers for processing image array signals; an amplifier offset calculator coupled to the amplifier signal processor for averaging values of the amplifier offset signals to yield average amplifier offset signals; a real-time relative gain calculator coupled to the amplifier signal processor for calculating a real time relative gain; an adjusted gain calculator coupled to the real time relative gain calculator for calculating the real time adjusted gain calibration image; and a corrected pixel value calculator coupled to the amplifier offset calculator.

DETAILED DESCRIPTION

Generally, the present invention provides compensation for amplifier offset and gain artifacts and for correcting exposure of image signals generated by a matrix-addressed x-ray imaging panel. In the imaging panel, a scan line controller controls field effect transistor (FET) switches associated with respective sensors to cause such switches to be in a conductive or non-conductive state. When the switches are de-energized (non-conductive state), a reading circuit reads and accumulates an average of correction signals read from all amplifiers. The value thus obtained represents an average of amplifier offsets. During normal image processing, the scan line controller energizes the scan lines so that an image array signal is read from each amplifier. The amplifier offset is compensated for in each imaging array signal by a calculating circuit for producing corrected image signals that account for the average correction signal from each imaging array signal produced by any amplifier.

The gain for each amplifier is determined on a "real time" basis in the sense that relative gain of each amplifier channel is determined over a short period of time, i.e., <<1 second. The obtained gain for each amplifier is digitized and stored for subsequent division from a digitized image signal obtained from a respective amplifier. The gain for each amplifier is determined by a scan line controller advantageously energizing all scan lines and shifting each scan line voltage by a predetermined amount from the scan line normal operating value so that a capacitive coupling naturally existing between scan lines and corresponding adjacent data lines is substantially enhanced, thereby resulting in an induced voltage on respective data lines. This induced voltage can be read out from each respective amplifier. The sensing circuit senses the value of each induced voltage, which is applied to a calculating circuit that sums all induced voltage values to yield a summed value. The calculating circuit calculates and stores individual amplifier gains by dividing each induced voltage value by the summed value, and then storing an integer value of the result as an individual amplifier gain. Each amplifier gain is retained for later combination with respective digitized amplifier readouts obtained during normal panel operation. The scan line controller shifts the scan line voltage back to the predetermined value to permit subsequent normal scan line control of each amplifier channel for detecting imaging array signals.

In the final step of the method of the invention, a calculating circuit divides the amplifier offset and each respective amplifier gain from the imaging array signal produced by each respective amplifier to produce corrected image signals.

Figure 1:
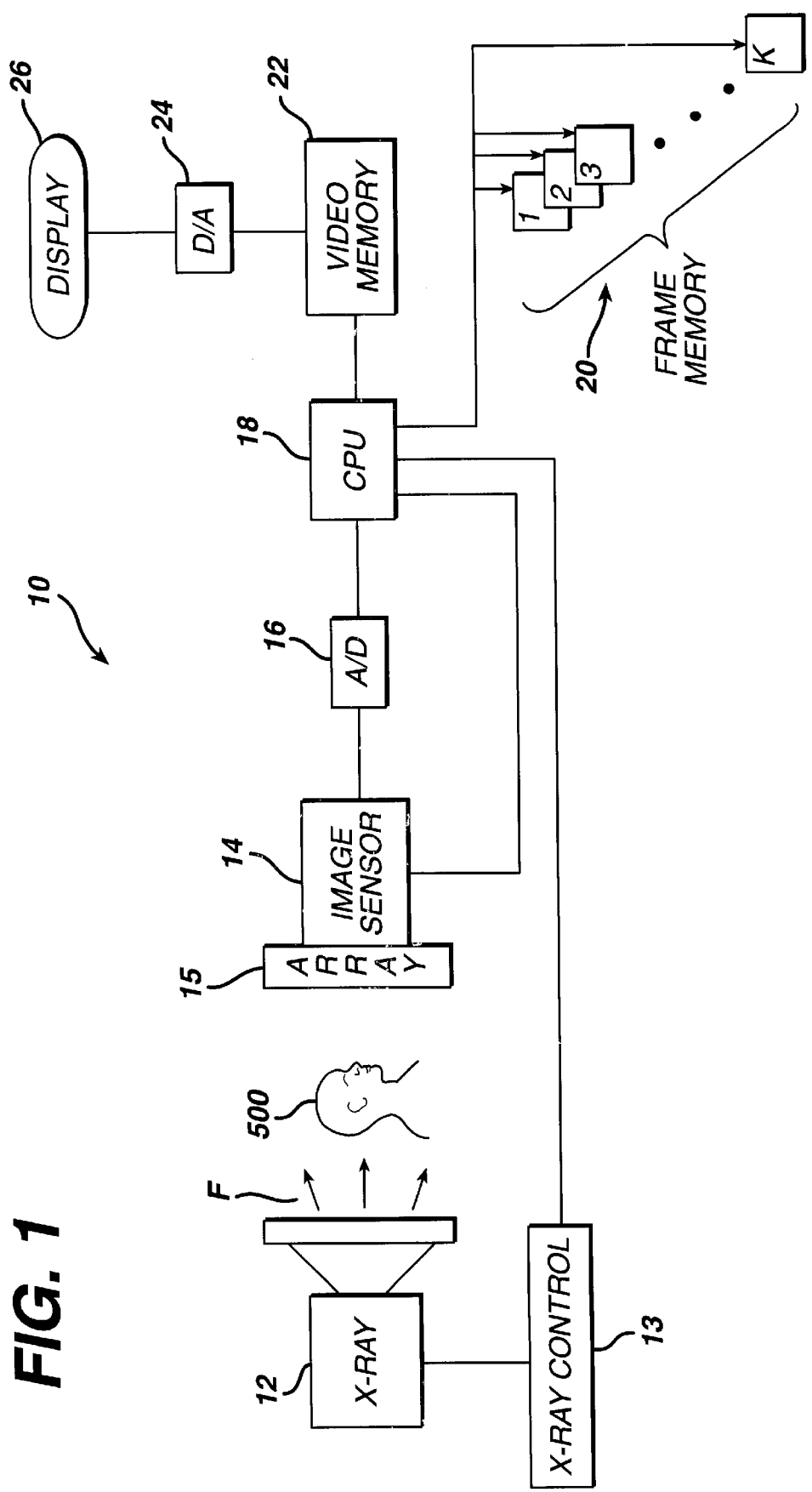
FIG. 1 is a simplified block diagram of the x-ray imaging system according to the present invention.

FIG. 1 is a simplified block diagram of a digital x-ray imaging system 10 according to the present invention. An x-ray source 12, controlled by a control 13, emits an x-ray irradiation field F toward the subject 500 to be imaged. An x-ray image sensor 14 located in the opposite side of the subject 500 from the source includes a two dimensional flat panel array 15 of light-receiving pixels that detects x-rays which pass through the subject. X-ray image sensor 14 typically includes a solid state flat panel 15 having a two-dimensional matrix of cells to be described later. An image signal output from the flat panel 15 is converted into digital data by an A/D (analog-digital) converter 16. The signal is processed by a CPU (central processing unit) 18 and then the signal is stored in frame memories 20 according to a predetermined arithmetic operation process. The reproduced tomographic image is delivered on a demand basis to a video memory 22, converted into an analog signal by D/A (digital-analog) converter 24, and then displayed via an image display device 26, such as a CRT (cathode-ray tube) display.

Figure 2:
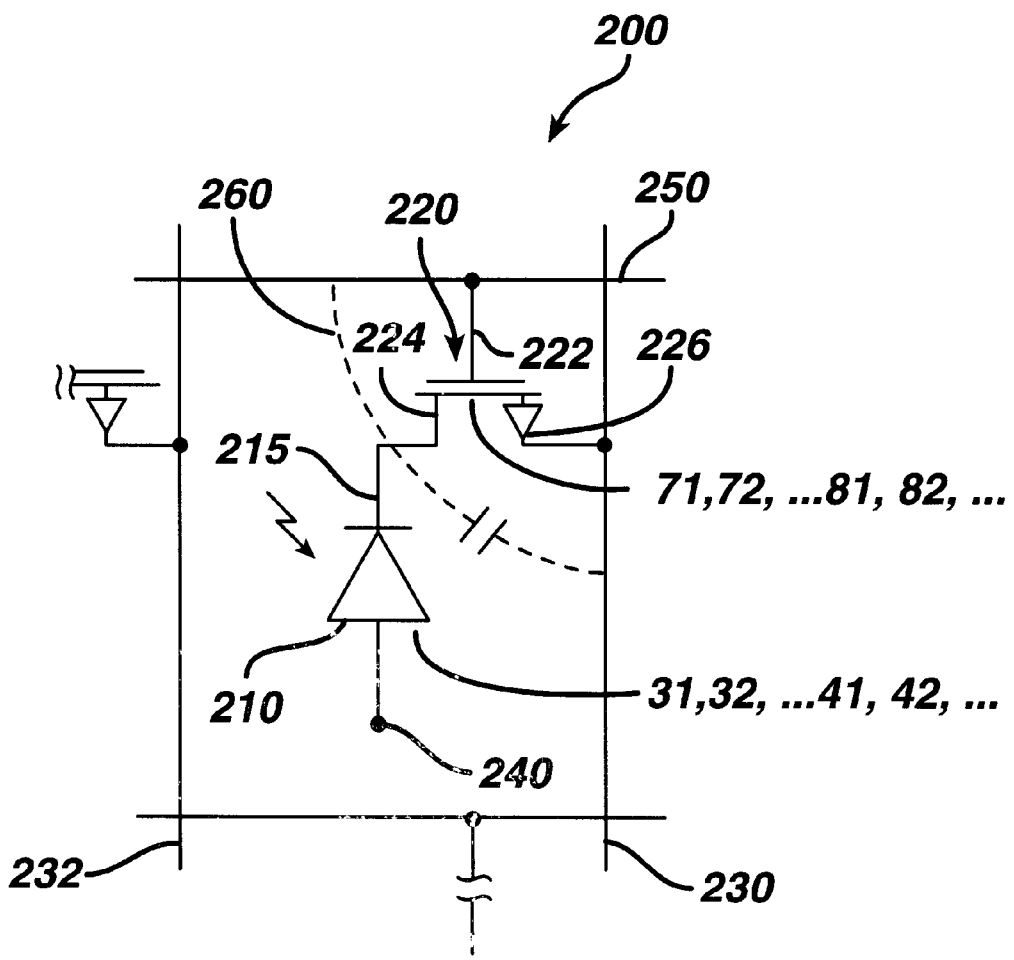
FIG. 2 is a schematic diagram of photodiode connections in a representative cell according to the present invention.
Figure 3:
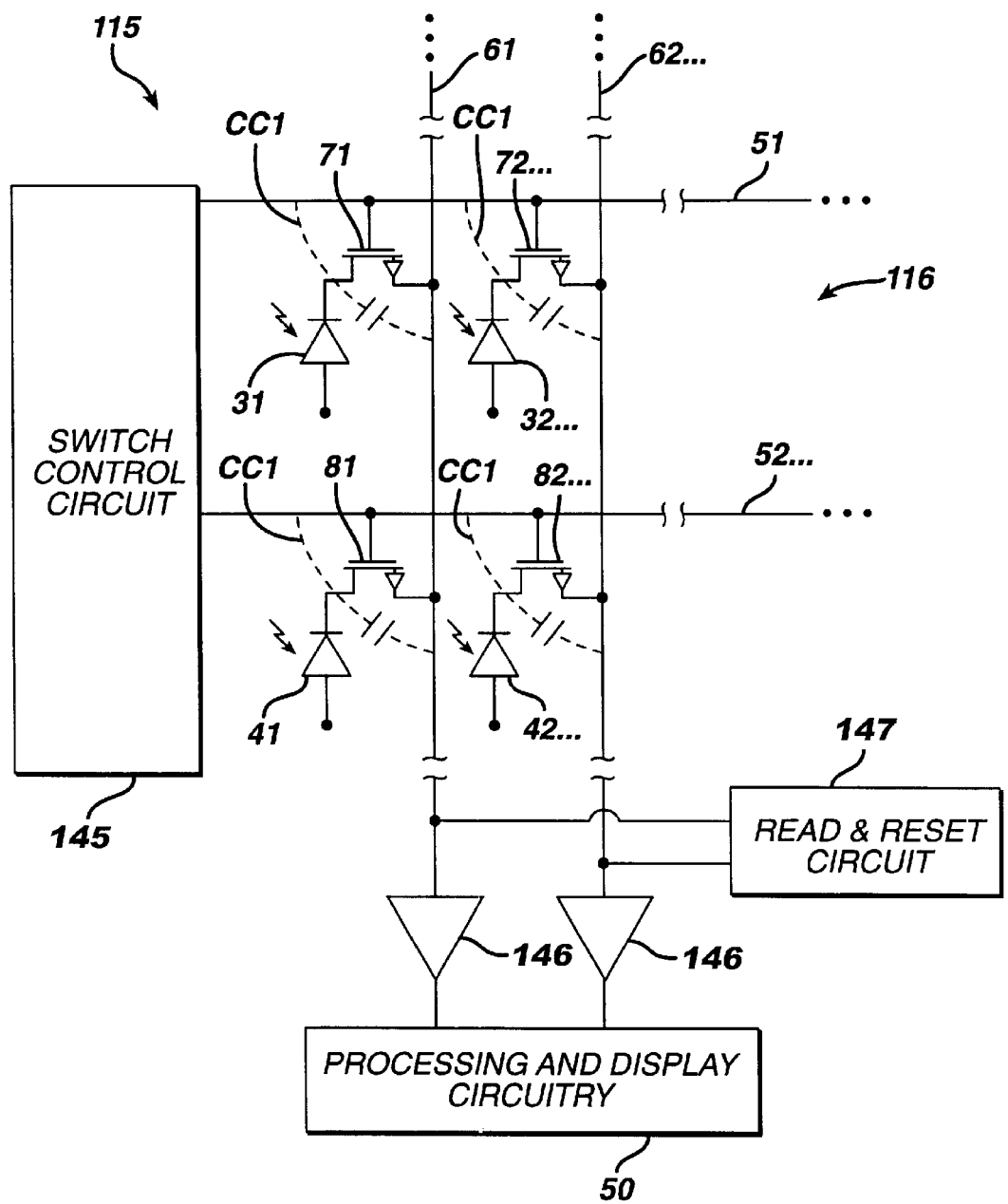
FIG. 3 is a schematic diagram of a plurality of the cell type shown in FIG. 2 showing cell interconnections and associated cell control circuitry according to the present invention.

FIG. 2 shows a representative cell 200 with reference numerals associated with features in common with all cells of the cell matrix of flat panel 15, a portion of which are shown in relation to each other in FIG. 3. For clarity of illustration, these reference numerals are omitted from FIG. 3. FIGS. 2 and 3 also show solid line connections illustrating connections made over electrical conductors, and dashed lines illustrating induced coupling to be described later.

Representative cell 200 comprises a photosensor element shown as a photodiode 210 having a radiation sensitive element for generating a signal representing one pixel (not shown) of light received by a photodiode 200, and a switching element 220 for causing signals generated by photodiode element 200 to appear on a connected data line 230. The photodiode 200 includes a connection point 240 indicating a connection to a common electrode (not shown) and which is disposed over, but is insulated from photodiode 200. The switching transistor 230 is a field effect thin film transistor having a gate electrode 222, a drain electrode 224 and a readout electrode 226, also known as a source electrode.

The gate electrode 222 of switching transistor T is connected to scan line 250. In operation, applying a signal (e.g., energizing to a potential) along scan line 250 causes switching transistor 220 to switch to a conductive state. When switching transistor 220 is conductive, a conductive path is formed between photodiode 210 and data line 230 via drain electrode 224 and readout electrode 226, thereby allowing charge accumulated on the photodiode diode to be read out as desired from data line 230. When the imager 10 is in operation, each photodiode common electrode connection point 240 is connected to a voltage bias source (not shown) that provides a bias different from ground potential.

FIG. 2 also illustrates a source of capacitive coupling between conductive components in the representative cell 200. For purposes of illustration, FIGS. 2 and 3 symbolize capacitive coupling in phantom by capacitor symbols connected by dashed lines, and do not represent a separate capacitor component in the array. For example, there is capacitive coupling 260 between data line 232 and adjacent scan line 250. (The representation in phantom is for illustrative purposes and does not represent a separate capacitor component in any way.) As used herein, "adjacent" conductive components refers to components that are spatially near one another but not in direct physical contact so that no direct conductive path (or short circuit) exists between the two components.

FIG. 3 illustrates a portion of the cells of array 15, each cell having the general representation of cell 200 shown in FIG. 2. By way of illustration and not limitation, an array 15 comprises a matrix of about 1000 by 1000 pixels fabricated on a 10 inch by 10 inch substrate. It should be recognized that a typical array of pixels and associated cells comprises M columns and N rows such that the image generated by a panel is derived from the combined outputs of all of the cells, when controlled by sequential activation of scan lines.

Scan lines 51, 52 correspond to scan lines 250, 252 of FIG. 2; data lines 232, 230 correspond to data lines 61, 62; photodiodes 31, 32. . . , 41, 42. . . , etc. correspond to photodiode 210; and transistors 71, 72,. . . , 81, 82,. . . , etc. correspond to transistor 220. As shown in FIG. 3 by dotted reference numerals, the components of all cells, scan lines, and data lines are extensible in number to suit the size of array 15.

For transistors 71, 72,. . . on the same row, e.g., the top row, respective gate electrodes 222 are connected to scan line 51. Similarly, for transistors 81, 82,. . . on a separate row, respective gate electrodes 222 are connected to scan line 52. For transistors 71, 72, each respective drain electrode 224 is connected to terminal 215 of a respective photodiode 31, 32. . . etc. For transistors 71, 81,. . . on a same column, respective readout electrodes 226 are connected to data line 61, and for transistors 72, 82, on a separate column, respective readout electrodes 226 are connected to data line 62, etc.

The scan lines 51, 52. . . (in addition to being connected to switching transistors 71, 72. . . , 81, 82,. . . , etc.) are also connected to a scan line controller 145. The data lines 61, 62,. . . are connected to respective amplifiers 146, which are read and reset by circuit 147. Sequential scanning of pixels is achieved by turning on and off respective rows of switching transistors 71, 72. . . , 81, 82,. . . , etc. by changes in scan line potentials under the control of scan line controller 145. A signal representing one pixel is conducted by a respective closed switching transistor to an associated data line that is connected to a respective readout amplifier 146.

The signal obtained from the readout amplifiers 146 includes a respective amplifier offset and gain resulting from the particular electrical characteristics of the circuit components, particularly as effected by temperature. When any one of controlled switches 71, 72..., 81, 82,... is turned on, the offset and gain artifacts are a part of the image signal which is conducted over a respective data line to a respective amplifier 146. With all of the controlled switches 71, 72..., 81, 82,... turned off, only the amplifier offset can be read from a respective amplifier 146.

Figure 4:
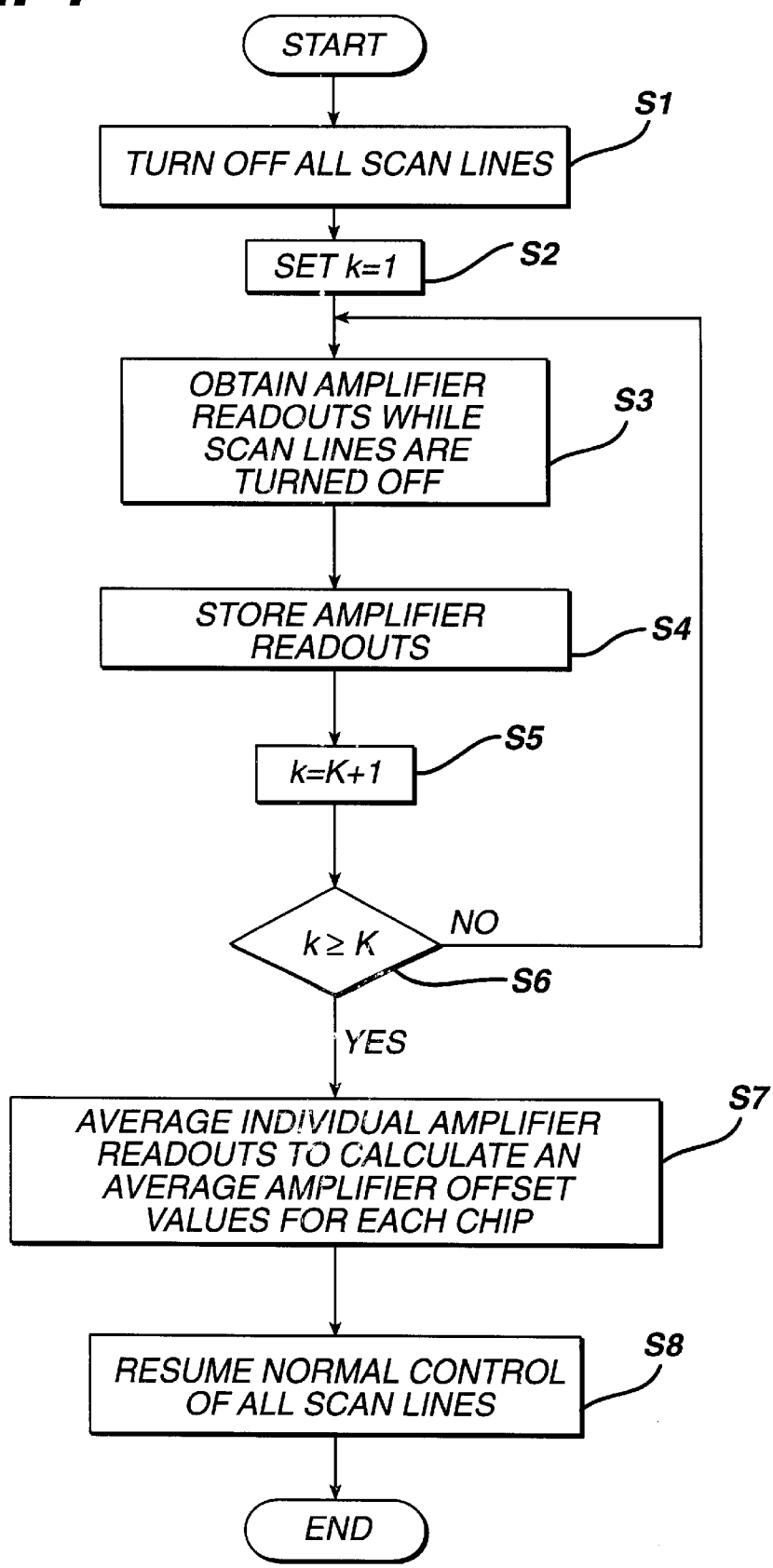
FIG. 4 is a flow diagram illustrating the real-time measurement of the amplifier offset according to the present invention.
Figure 8:
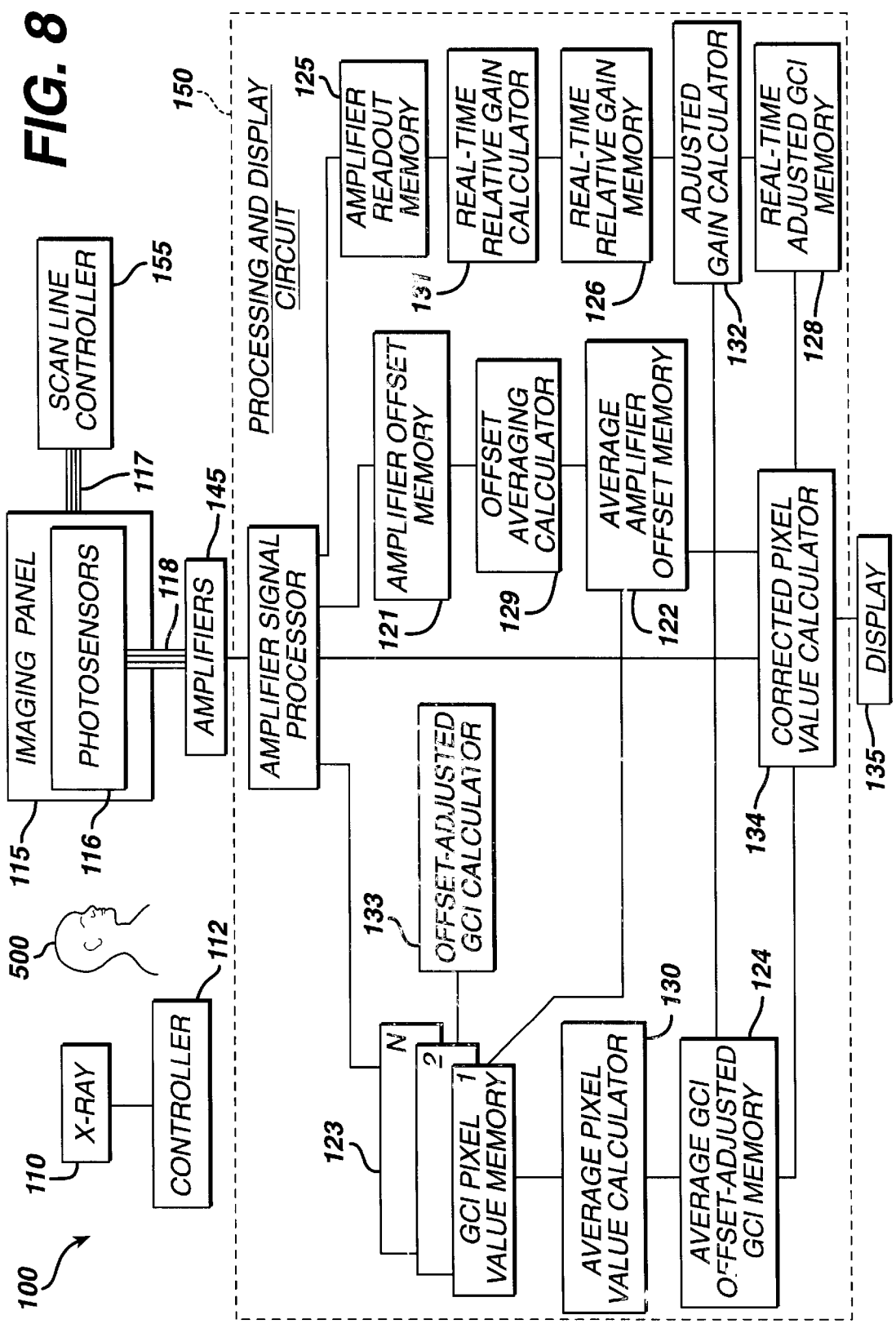
FIG. 8 shows an exemplary system for performing the method for correcting amplifier offset and gain artifacts according to the present invention.

FIG. 4 is a flow diagram illustrating the method for calculating amplifier offset of the present invention as applied to image system 100, illustrated in FIG. 8. Preliminary to application of the present method, a determination will be made as to the total additional line times K to be added to determine an amplifier offset for image system 100. For these K additional reads, no scan lines are turned on and therefore the measured signal read at each amplifier is only the amplifier offset for that amplifier. The values of signals measured at all amplifiers from all K reads are averaged to reduce the effect of electronic noise and to provide sub-count precision. The average is the average amplifier offset of all amplifiers located on a single. amplifier circuit chip, herein referred to as an "amplifier chip" and a digital form of separate average amplifier offset values for each amplifier chip are stored for subsequent combination with digital values of image signals representing each pixel obtained from a respective amplifier chip obtained during normal operation of image system 100.

With the total additional line times pre-established, the sequence of the method begins with step SI, at which all scan lines are turned off, i.e., all scan lines are maintained at a large negative voltage (typically −8V to −16V). At step S2, the counter k is set equal to 1. At step S3, amplifier outputs are read as amplifier offsets while the scan lines remain turned off, and at step S4, the amplifier offsets are stored. At steps S5 and S6, counter k is incremented until all K reads have been completed. At step S7, the arithmetic average of all individual amplifier offsets for each amplifier chip is calculated to yield a set of average amplifier offsets in digital form for system 100, thereby reducing the effect of electronic noise and to give sub-count precision. At step S8, normal control of the scan lines is resumed.

This method may also be performed with K=1 by averaging adjacent amplifier channels, i.e., assuming the offset variation is consistent. As long as the time constant for the offset drift is long compared to the time to read the panel, then the offset measured from these k frames will provide an adequate representation of the amplifier offset and allow proper measurement If the time constant for drifts is of the same order as the readout time, then multiple offset measurement reads, i.e., with the scan lines off, can be interspersed throughout the imager readout. Although this lengthens the total readout time, it advantageously decreases the amount of time between amplifier offset measurements.

In a second embodiment, the offset correction is accomplished in an analog part of each amplifier chip including respective amplifiers before the image signal is subjected to A/D conversion.

For two dimensional x-ray detectors, gain correction must be made on a pixel by pixel basis using a gain calibration image (GCI) procedure performed relatively infrequently, which is subsequently updated by a second, relatively "real-time" gain measurement procedure applied during normal imager operation, i.e., when image signals representing an irradiated subject are obtained. The GCI essentially is a map of the gain of every pixel. This gain map varies from pixel to pixel due to many reasons, including, for example, scintillator variations, variations in the spatial distribution of x-ray flux from the x-ray tube, variations in the gain of each photodiode, and variations in the gain of each amplifier chip. The creation of the GCI is time consuming, and therefore it is preferred that a GCI be made infrequently, e.g., once per month. Since the amplifier gain may drift throughout the day as electronic component temperatures shift, it is highly desirable to be able to obtain a fast, noise free, amplifier gain, referred here as a real-time gain measurement. The frequency of obtaining the real-time gain measurement is a matter of choice, as it can be obtained before, during, or after the imager read-out, depending on the relative time constants for the gain drift and imager panel real-out time. For this reason, the real-time gain measurement of the amplifiers is must be stored in software and used to modify the base GCI image, which is also stored in software, to be applied to an image signal, to yield a corrected image signal.

Figure 5:
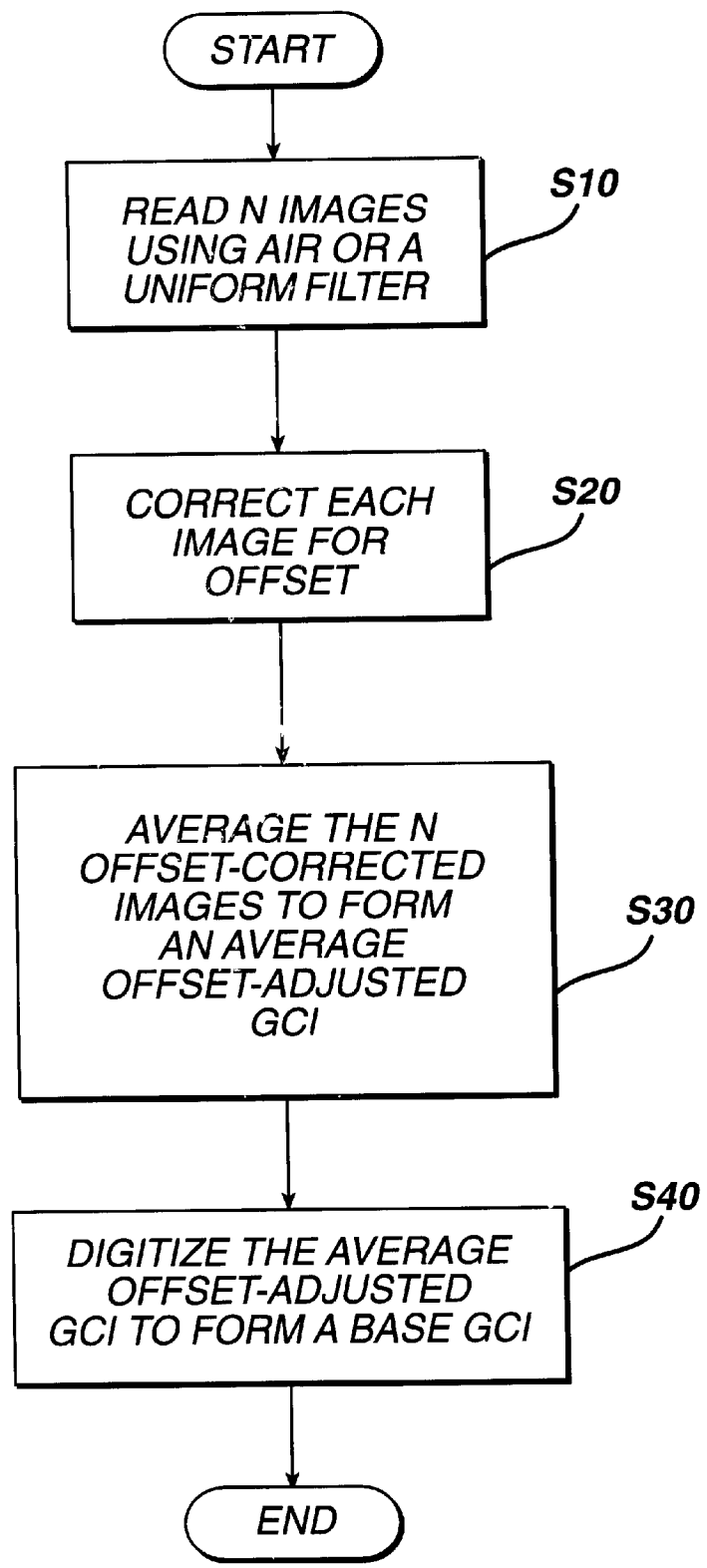
FIG. 5 is a flow diagram illustrating generation of a base gain corrected image according to the present invention.

FIG. 5 is a flow diagram illustrating the method of the present invention showing the steps for generating a base GCI. Step S10 shows the collection, i.e., reading and storage of N x-ray images with only air or a uniform filter between the x-ray beam and the detector. Step S20 shows the calculation of an offset correction of each of the collected N images, which are also stored as offset-corrected images. Step S30 shows the calculation of a pixel-by-pixel average of the offset-corrected N images to form an offset-corrected average image. Averaging the images together suppresses x-ray quantum noise. Step S40 shows digitization of the offset-corrected average image to form a base GCI. Step S50 shows the storage of the base GCI for subsequent recall during normal imager operation.

In order to measure real-time amplifier gain, advantage is taken of a fringe capacitance GCI (shown in FIG. 2) existing between any scan line and an adjacent data line by the following method. A known signal is applied to a selected scan line without interfering with the normal operation of the imager. This signal is applied through use of the scan line electronics. In normal operation, the scan line voltage is maintained at a large negative voltage, typically −8V to −16V, to keep the transistor 220 (shown in FIG. 2) in the "off" state. To turn the transistor 220 "on", the scan line voltage of a selected scan line is driven past the transistor 220 threshold voltage and up to a large positive voltage (typically +6V to +12V). Since the scan line is capacitively coupled to respective data lines, which are connected to the readout amplifiers, the changing scan line voltage induces a large signal in a respective amplifier. As the scan line is returned to its negative voltage, a signal of the same amplitude and opposite sign is induced in the amplifier. In normal operation, the double-sampling amplifier is read once before the scan line is turned on and once after it has turned off and so this effect is not seen. To ensure that this large signal does not clip the amplifier, a "scan line compensation" procedure may be used. To this end, when one scan line is turned on, the voltage on a large number of other scan lines, e.g., 128, is shifted slightly in the other direction (e.g., 128 lines shifted about 0.05 volts to about 0.5 volts in the other direction) so that the total induced charge is mostly canceled. A modification of this technique, shown in FIG. 6, is used in the present invention to make the real-time gain measurement of each amplifier.

Figure 6:
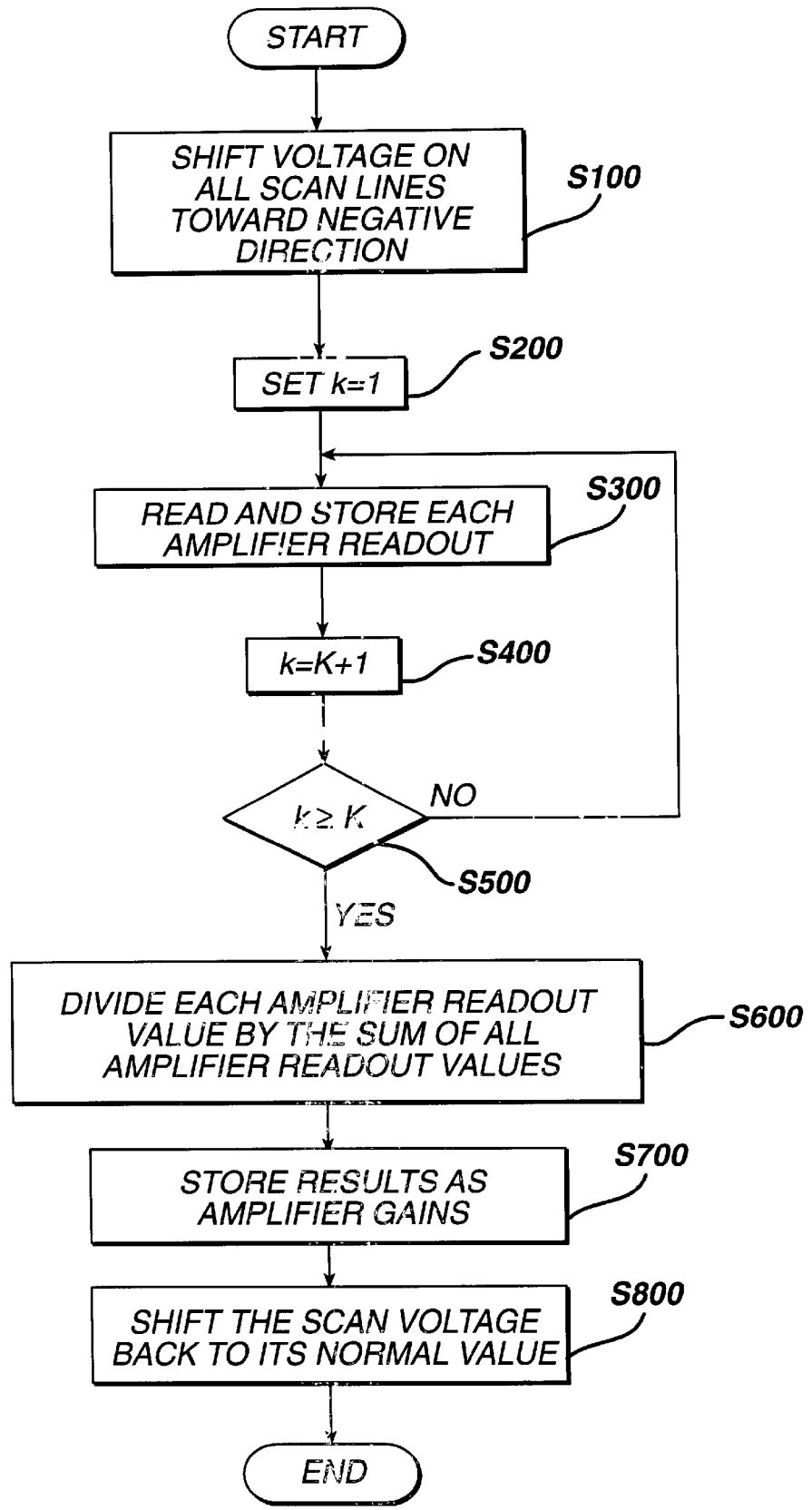
FIG. 6 is a flow diagram illustrating measurement of real-time amplifier gain according to the present invention.

FIG. 6 is a flow diagram illustrating the method of the present invention showing the steps for measuring of real-time amplifier gain. A modification of the scan line compensation technique is used to make this measurement. As in the offset correction method described above in which the read-time of K lines is K line times, the readout timing may be modified by adding K line times before the panel readout begins and the first scan line is turned on. For these additional K reads, at step S100, the voltage on a number of scan lines is shifted to a more negative value to provide the desired effect. In one embodiment of the invention, the shift is accomplished by applying a small voltage correction, e.g., less than 0.1V, to hundreds (or all of ) the lines; in another embodiment, a larger voltage correction (e.g., about I volt) is applied to at least about 10 lines. At step S200, the counter k is initialized to equal 1. At steps S300–S500, k is incremented until each amplifier is sampled and the value read is stored, until k=K. In step S600, the value read from each amplifier is divided by the summed values (e.g., the average value over the K reads for each channel) from all amplifiers to provide a real-time relative gain measurement of each amplifier that is not dependent on the accuracy of the scan line voltage changes. The resulting respective real-time amplifier gains are stored at step S700. At step S800, the scan voltage is shifted back to its normal value. For amplifiers with many channels on a single amplifier chip, K may be reduced to 1 and the electronic noise suppression and sub-count precision may be obtained by averaging the adjacent channels on the amplifier chip. As with the above-described amplifier offset correction, this may be done before, during, or after (or both before and after) the imaging read-out, depending on the relative time constants for the gain drift and panel readout time.

Figure 7:
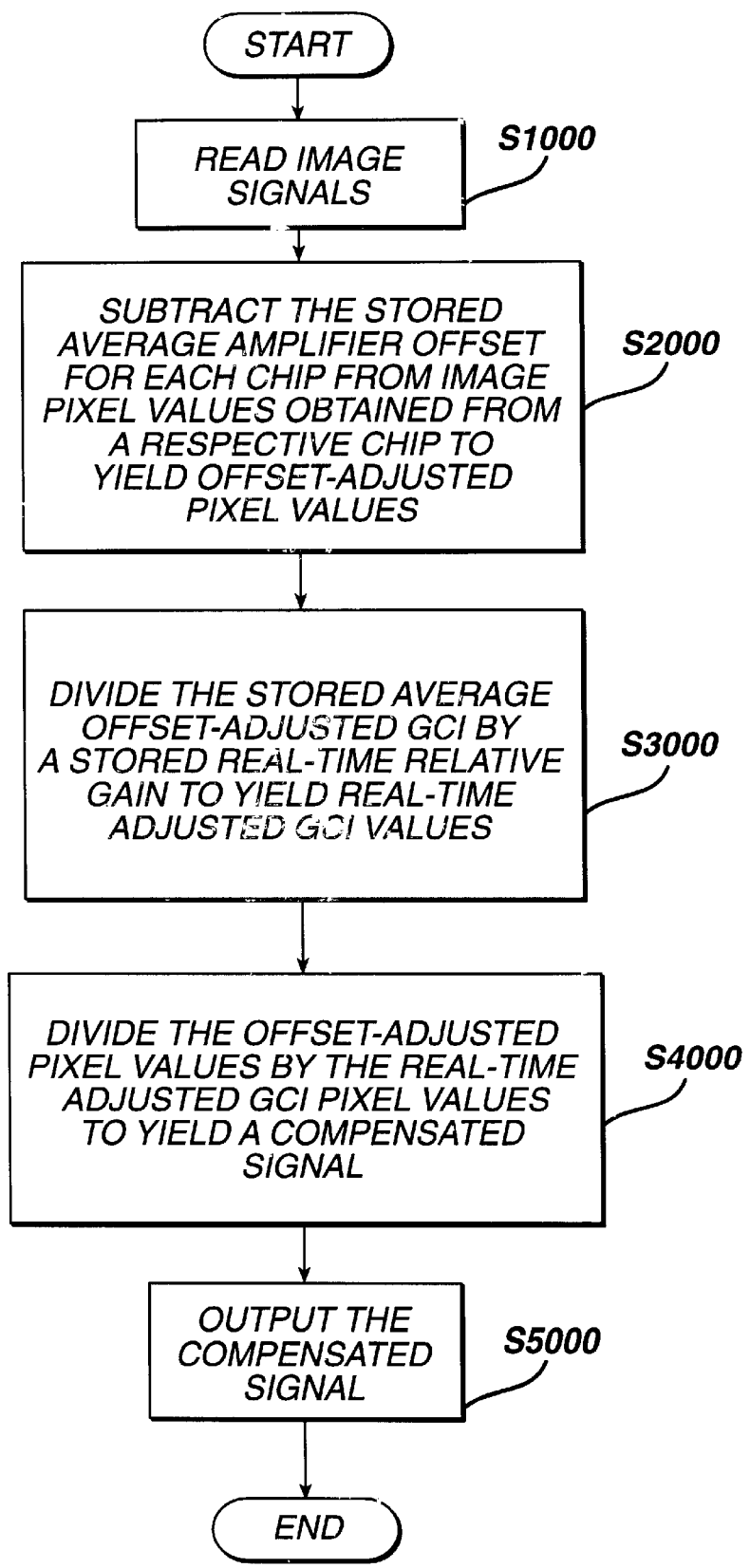
FIG. 7 is a flow diagram of the method of the present invention to correct an image signal according to the present invention.

FIG. 7 is a flow diagram of the method of the present invention to correct an image signal comprising pixel values obtained while irradiating a subject with an image system such as image system 100 illustrated in FIG. 8. The method illustrated in FIG. 7 corrects the image signal in what can be generally described in terms of three steps in the sequence: 1) correcting the image signal to yield an offset-adjusted image signal, 2) applying a real-time gain to a base GCI to yield a real-time adjusted GCI (i.e., an updated gain), and 3) calculating an offset and gain compensated image signal by applying the real-time adjusted GCI values to the offset-adjusted image signal.

FIG. 7 illustrates these three general steps in more detail. At step S1000, an image signal comprising individual pixel values is read by commonly known methods, for example by the processing and display circuit 150 connected to readout amplifiers 145, shown in FIG. 8. At step S2000, the stored average amplifier offset for each amplifier chip obtained by the method illustrated in FIG. 4 is subtracted from all image pixel values obtained from a respective amplifier chip and the results are stored as offset-adjusted image pixel values. It will be recalled that the base GCI is obtained at relatively infrequent intervals, and that a real-time gain compensation of each pixel value therein would be advantageous, resulting in a real-time adjusted GCI. At step S3000, a real-time adjusted GCI is obtained by dividing on a pixel-by-pixel basis an average offset-adjusted GCI obtained from memory, as illustrated in FIG. 5, by a real-time relative gain obtained from memory, as illustrated in FIG. 6, to yield real-time adjusted GCI values. At step S4000, on a pixel-by-pixel basis, the offset-adjusted pixel values obtained in step S1000 are divided by the real-time adjusted GCI pixel values obtained in step S3000, to produce a signal compensated for amplifier gain and offset which is outputted in step S5000 to form a corrected image.

Referring now to FIG. 8, the exemplary system 100 is illustrated as including an x-ray radiation source 110 controlled by the controller 112 for irradiating a subject, an imaging panel 15 which is the same imaging panel 15 shown in FIG. 3, amplifiers 146, scan line controller 145, and a programmable processor 150.

The imaging panel 15 includes photosensors 116 controlled by controller 145 connected to scan lines 117, the photosensors 116 also connected by data lines 118 to readout amplifiers 146, all arranged and connected as shown in FIG. 3. Each photosensor 116 is operatively controlled from a connected scan line 117 connected to scan line controller 145 to selectively pass a signal from the sensor 116 to a corresponding data line 118. Columns of photosensors are connected by respective data lines 118 to respective amplifiers 146. The amplifiers 146 are connected to the processor 150, which preferably is a programmed computer memory that includes an amplifier signal processor 120 for polling the amplifiers 146, memories 121–128, and calculators 129–132. The amplifiers 146 are connected to amplifier signal processor 120 for reading both image signals and calibration signals applied to each amplifier 146 from data lines 118. The amplifier signal processor 120 has four outputs, to be described next.

The first output is connected to an amplifier offset memory 121 for individually storing amplifier offset signals read from respective amplifiers when the scan lines are turned off. An offset averaging calculator 129 connected to amplifier offset memory 121 and to average amplifier offset memory 122, averages the stored amplifier offset values associated with each amplifier chip to yield a single average offset correction value for each respective chip, which is stored in average amplifier offset memory 122 for subsequent use.

The second output of amplifier signal processor 120 is connected to a GCI pixel value memory 123, which stores the values of N GCI's. An offset-adjusted GCI calculator 133 connected to GCI pixel value memory 123 and to average offset memory 122, subtracts on a pixel-by-pixel basis the average offset correction value obtained from average offset memory 122 from each of the N GCI's and replaces each of the N GCI's with an offset-adjusted GCI stored in GCI memory 123. An average GCI pixel value calculator 130 connected to the GCI pixel value memory 123 and to an average GCI pixel value memory 124, calculates averages of all corresponding pixel values of the N offset-adjusted GCI images and stores the digitized averages as average offset-adjusted GCI pixel values in average offset-adjusted GCI memory 124 for subsequent use.

The third output of amplifier signal processor 120 is connected to an amplifier readout memory 125, which stores amplifier outputs when real-time amplifier relative gain is measured. The values stored in memory 125 were previously obtained according to the method illustrated in FIG. 6, wherein it will be recalled that the voltage on a large number of scan lines was shifted to a more negative value by a small amount, prior to storage of polled amplifier voltage values, i.e., pixel values, which are stored in memory 125. A real-time amplifier relative gain calculator 131 connected to amplifier readout memory 125 and to a relative gain memory 126 calculates a real-time relative gain by dividing the value read from each amplifier stored in amplifier readout memory 125 by a sum of the values read from all amplifiers stored in memory 125, and then stores the result as a real-time relative gain value in real-time relative gain memory 126. The adjusted gain calculator 132 connected to real-time relative gain memory 126, average offset-adjusted GCI memory 124, and to real-time adjusted GCI memory 128, calculates an updated value of gain by dividing on a pixel-by-pixel basis the average offset-adjusted GCI pixel values obtained from memory 124 by the real-time relative gain obtained from memory 126 to yield real-time adjusted GCI values stored in a real-time adjusted GCI memory 128 for subsequent use.

The values in memory 128 are recalculated as desired, or at least when the real-time relative gain changes.

The fourth output of amplifier signal processor 120 is operative during normal imager operation, such as when image pixel values corresponding to an image of an irradiated subject are obtained. The amplifier signal processor 120 is connected to a corrected pixel value calculator 134, which, in addition to being connected to a display 135 for output of calculated results, is connected to the average amplifier offset memory 122, average offset-adjusted GCI memory 124, and real-time adjusted GCI memory 128. During normal imager operation, i.e., when a subject is being imaged, the corrected pixel value calculator 134 calculates an offset and gain compensated value for every pixel value read from a corresponding amplifier polled by amplifier signal processor 120 in two steps. In the first step, compensation for amplifier offset is obtained on a respective amplifier chip basis, wherein each image pixel value is corrected for offset by subtracting the average amplifier offset value of the respective amplifier chip obtained from memory 122 to yield an offset-adjusted image signal. In the second step, corrected pixel value calculator 134 corrects for gain by dividing the offset-adjusted image pixels on a pixel-by-pixel basis by the real-time adjusted GCI read from memory 128, to yield corrected pixel values which are output as integer values to a video processing and display 135. As stated above, the values in memory 128 are recalculated as desired, or at least when the real-time relative gain changes.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of compensating for amplifier gain in imaging array signals provided by a plurality of sensors in a matrix addressed x-ray imaging panel, each sensor being connected by a corresponding controlled switch to a corresponding data line, said data lines being sequentially arranged, each of said controlled switches being operably controlled from a connected scan line to selectively pass a signal from the corresponding sensor to said corresponding data line, all said scan lines having voltages set to a predetermined value in a specified direction, each said data line being attached to a respective one of a plurality of amplifiers, wherein an offset-adjusted base gain calibration image has been obtained and stored, comprising:

shifting said scan line voltages by a predetermined amount so that an amplifier readout signal is provided by each amplifier;

reading the amplifier readout signal provided by each amplifier;

calculating a summed value of the amplifier readout signals;

calculating a real-time relative gain from said summed values;

dividing on a pixel-by-pixel basis said offset-adjusted base gain calibration image by said real-time relative gain to yield a real-time adjusted gain calibration image;

shifting said scan line voltages to normal operating values;

reading an imaging array signal provided by a respective amplifier; and dividing on a pixel-by-pixel basis said imaging array signal by said real-time adjusted gain calibration image to yield an imaging array signal compensated for amplifier gain.

2. The method of claim 1, wherein the step of calculating a summed value comprises summing all said amplifier readout signals.

3. The method of claim 1, wherein the step of calculating individual amplifier gains comprises dividing each said read amplifier readout signal by said summed value.

4. The method of claim 1, wherein the step of calculating a summed value comprises arithmetic summing each said imaging array signal with said respective individual amplifier gain.

5. A method of compensating for amplifier offset and gain in imaging array signals provided by a plurality of sensors in a matrix-addressed x-ray imaging panel, each sensor being connected by a corresponding controlled switch to a corresponding data line, said data lines being sequentially arranged, each of said controlled switches being operably controlled from a connected scan line to selectively pass a signal from the corresponding sensor to said corresponding data line, all said scan lines having voltages set to a predetermined value in a specified direction, each said data line being attached to a respective one of a plurality of amplifiers, wherein an offset-adjusted base gain calibration image has been obtained and stored, the method comprising:

applying imaging energy from an imaging energy source to said imaging panel;

turning off all scan lines of the imaging panel;

reading an amplifier offset signal from each of said amplifiers while the scan lines are turned off;

calculating an average of said amplifier offset signals from each said amplifier to produce an average amplifier offset;

turning on said scan lines;

shifting said scan line voltages by a predetermined amount so that an amplifier readout signal is provided by each amplifier;

reading the amplifier readout signal provided by each amplifier;

calculating a summed value of the amplifier readout signals;

calculating a real-time relative gain from said summed values;

dividing on a pixel-by-pixel basis said offset-adjusted base gain calibration image by said real-time relative gain to yield a real-time adjusted gain calibration image;

shifting said scan line voltages to normal operating values;

reading an imaging array signal provided by a respective amplifier;

applying said average amplifier offset from said imaging array signal to yield an offset-adjusted image signal; and dividing on a pixel-by-pixel basis said offset-adjusted image signal by said real-time adjusted gain calibration image to yield an image signal compensated for amplifier offset and gain.

6. A system for correcting imaging array signals produced by a matrix-addressed sensing panel including a plurality of sensors arranged in columns and rows, each sensor being controlled by a scan line controller for producing respective imaging array signals, amplifier offset signals, and amplifier readout signals, said sensors having an amplifier offset and an amplifier gain and being connected to respective data lines for transmission to respective amplifiers, the system comprising:

an amplifier signal processor connected to said amplifiers for processing said image array signals, said amplifier offset signals and said amplifier readout signals;

an amplifier offset calculator connected to said amplifier signal processor for averaging values of said amplifier offset signals to yield average amplifier offset signals;

a real-time relative gain calculator connected to said amplifier signal processor for calculating a real-time relative gain;

an adjusted gain calculator connected to said real-time relative gain calculator for calculating a real-time adjusted gain calibration image;

a corrected pixel value calculator connected to said amplifier offset calculator, said real-time relative gain calculator, and said adjusted gain calculator for calculating a corrected image array signal compensated for amplifier offset and gain.

7. The apparatus of claim 6, wherein said real-time relative gain calculator divides each of said amplifier readout signals by a sum of all amplifier readout signals to yield said real-time relative gain.

8. The apparatus of claim 7, wherein said adjusted gain calculator divides an average offset-adjusted gain calibration image by said real-time relative gain to yield said real-time adjusted gain calibration image.

9. The apparatus of claim 8, wherein said average offset-adjusted gain calibration image is an average of a plurality of offset-adjusted gain calibration images.

10. The apparatus of claim 9, wherein said plurality of offset-adjusted gain calibration images is a plurality of base gain calibration images each adjusted for offset.

11. The apparatus of claim 7, wherein said corrected pixel value calculator calculates said corrected image array signal compensated for amplifier offset and gain by subtracting said average amplifier offsets from said image array signals to yield a result and dividing said result by said real-time adjusted gain calibration image.

12. The apparatus of claim 6, further comprising a video processing and display circuit connected to said corrected pixel value calculator for displaying said corrected image array signals.

13. A method of compensating for amplifier offset in imaging array signals provided by a plurality of sensors in a matrix-addressed x-ray imaging panel, each sensor being connected by a corresponding controlled switch to a corresponding data line, said data lines being sequentially arranged, each of said controlled switches being operably controlled from a connected scan line to selectively pass a signal from the corresponding sensor to said corresponding data line, each of said data lines being connected to a respective one of a plurality of amplifiers, the method comprising the steps of:

turning off the scan lines of the imaging panel;

reading an output signal from each said amplifier and storing the output signal while the scan lines are turned off;

calculating offset of the amplifiers from the output signal;

energizing said scan lines;

reading an output signal from each said amplifier while the scan lines are turned on; and applying said amplifier offset from said output signal to produce a compensated image array signal, wherein the step of calculating amplifier offset comprises averaging said output signals from each amplifier chip to produce an average amplifier offset for all amplifiers located on said each amplifier chip.

14. A method of compensating for amplifier offset in imaging array signals provided by a plurality of sensors in a matrix-addressed x-ray imaging panel, each sensor being connected by a corresponding controlled switch to a corresponding data line, said data lines being sequentially arranged, each of said controlled switches being operably controlled from a connected scan line to selectively pass a signal from the corresponding sensor to said corresponding data line, each of said data lines being connected to a respective one of a plurality of amplifiers, the method comprising the steps of:

turning off the scan lines of the imaging panel;

reading an output signal from each said amplifier and storing the output signal while the scan lines are turned off;

calculating offset of the amplifiers from the output signal;

energizing said scan lines;

reading an output signal from each said amplifier while the scan lines are turned on; and applying said amplifier offset from said output signal to produce a compensated image array signal, wherein the step of reading a readout signal while said scan lines are turned off comprises reading a readout signal provided by a selected sequential pair of amplifiers.

* * * * *

UNITED STATES PATENT AND TRADEMARK OFFICE
CERTIFICATE OF CORRECTION

PATENT NO. : 6,393,098 B1
DATED : May 21, 2002
INVENTOR(S) : Albagli

It is certified that error appears in the above-identified patent and that said Letters Patent is hereby corrected as shown below:

<u>Title page,</u>
Item [54], ABSTACT,
Line 2, please delete "tinder" and insert -- under --

Signed and Sealed this

Fifteenth Day of October, 2002

*Attest:*

*Attesting Officer*

JAMES E. ROGAN
*Director of the United States Patent and Trademark Office*